G. E. CANHAC.
LIQUID FUEL FURNACE.
APPLICATION FILED OCT. 16, 1913.

1,121,474.

Patented Dec. 15, 1914.
2 SHEETS—SHEET 1.

WITNESSES

INVENTOR

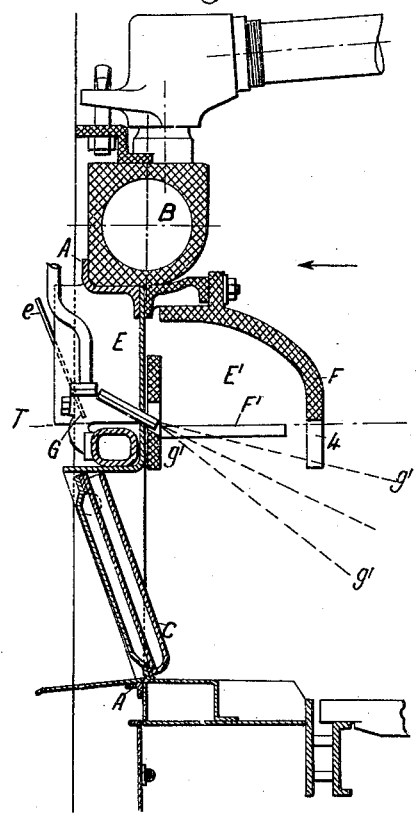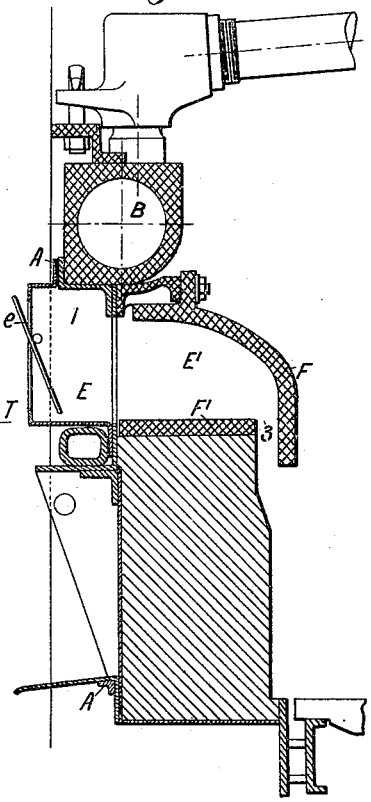

UNITED STATES PATENT OFFICE.

GEORGES EUGÈNE CANHAC, OF ST.-DENIS, FRANCE, ASSIGNOR TO SOCIETE ANONYME DES ETABLISSEMENTS DELAUNAY-BELLEVILLE, OF ST.-DENIS, FRANCE, A CORPORATION OF FRANCE.

LIQUID-FUEL FURNACE.

1,121,474.  Specification of Letters Patent.  Patented Dec. 15, 1914.

Application filed October 16, 1913. Serial No. 795,511.

*To all whom it may concern:*

Be it known that I, GEORGES EUGÈNE CANHAC, citizen of the French Republic, residing at St.-Denis, Department of the Seine, in France, have invented certain new and useful Improvements in Liquid-Fuel Furnaces; and I do hereby declare the following to be a full, clear, and exact description of the invention, such as will enable others skilled in the art to which it appertains to make and use the same.

The present invention relates to boiler furnaces heated by means of liquid fuel, and has for its object the provision of means for supplying the combustion supporting air to the fuel burners.

The invention consists in providing on the interior of the furnace, an air compartment, the lower part of which is provided with relatively large openings disposed one directly above the jet issuing from each fuel burner, so that the air from said compartment is supplied in large blasts over a relatively large surface of the fuel jet.

The invention further contemplates the provision of air chambers located exteriorly of the furnace and in communication with the interior air compartment to supply the same with the combustion supporting air to be supplied to the fuel burners.

The invention is illustrated in the accompanying drawings, in which:—

Figure 1:
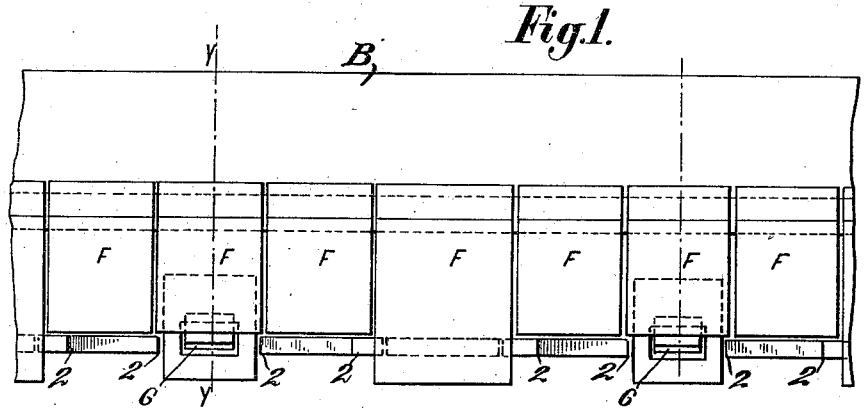
Figure 4:
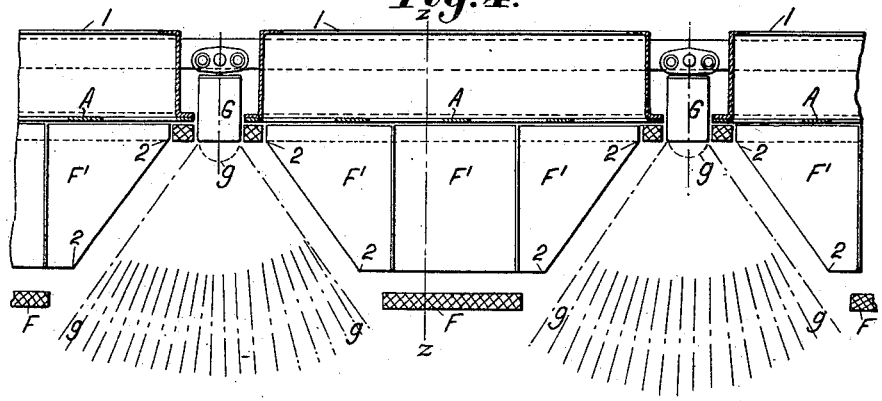

Figure 1 is an elevation of the interior air compartment looking in the direction of the arrow in Fig. 2; Fig. 2 is a vertical section taken on the line Y—Y of Fig. 1; Fig. 3 is a vertical section taken on the line Z—Z of Fig. 4; Fig. 4 is a horizontal section taken on the line T—T of Fig. 2.

Referring to the drawings, the casing of the furnace is indicated at A, with which the lower collector B of the boiler coils, and the furnace doors C are associated.

The furnace is provided with a plurality of oil burners G, which may be of any suitable type, but in the present instance, are of that type which is adapted to inject a flat sheet-like jet of fuel into the furnace, as clearly shown at $g$ in Fig. 4.

Disposed in the interior of the furnace, and substantially in the same plane with the discharge end of the fuel burners, is a shelf-like partition composed of a plurality of refractory plates F', the plates adjacent the fuel burners having their adjacent edges diverging from the nozzle of the burner toward the interior of the furnace to leave a relatively large V-shaped opening 2—2—2—2, as clearly shown in Fig. 4. A casing composed of refractory plates F is secured to the inner wall of the furnace casing above the partition F', and curved downwardly around the inner edge of said partition to form an air compartment, as shown in Figs. 2 and 3. Certain of the plates F intermediate the fuel burners extend to a lower level than those immediately adjacent the fuel burners. In this way, an opening 4 is provided, coöperating with the opening 2—2—2—2 to permit the jet issuing from the fuel burner to pass through the lower part of the air compartment without obstruction. As shown in the drawings, the burners illustrated are of that type which direct the jet in a downward direction and are so disposed with respect to the opening in the air compartment, that said opening lies directly over the entire jet.

The lower extremities of the refractory plates F are preferably spaced from the inner edges of the plates F' to leave an opening through which the air may pass in a downward direction.

Air is supplied to the compartment E' formed by the plates F, F' and the wall of the furnace, from air chambers 1, preferably formed of sheet-metal and secured to the outer wall of the furnace. These chambers in the present instance take the form of horizontally disposed box-like structures communicating with the compartment E' through relatively large openings provided in the wall of the furnace. The air chambers 1 may be provided with the shutters $e$ controlling communication between the chambers and any suitable heating device which may be employed to supply the chambers 1 with heated air.

The operation of such a construction is as follows: The air admitted to the chambers 1 passes freely to the compartment E', a portion of which is supplied in large quantities through the openings 2—2—2—2 in the partition F' to the jet issuing from the burners. As the opening is disposed directly above the jet, the blast of air descends directly thereupon and envelops the jet in a large quantity of fresh combustion supporting air. A portion of the air in the compartment E' passes through the opening between the inner edge of the plates F' and the lower edge of the plates F, and is directed between the adjacent jets issuing from the burners. The air so supplied from the compartment E' serves to agitate the gases and mix therewith a large quantity of fresh air to hasten the combustion.

The jets issuing from the burners expand in a lateral and vertical direction to form V-shaped and sheet-like discharges, as clearly shown in Figs. 2 and 4, at $g'-g'-g'$, which represents the vertical expansion of the jet, and at $g-g-g$, which represents the horizontal expansion thereof. As the burners employed in the present instance are of that type which eject a jet of the foregoing character, the opening in the partition composed by the plates F' is preferably shaped as shown in the drawing, to conform with the shape of the jet, but obviously, burners of other types may be used, and the opening through which the burner discharges may be shaped according to the character of the jet issuing from such a burner. The discharge end of each burner is shown as being disposed in substantially the same plane with the refractory plates F', but as the burners are inclined downwardly, the body of the jet which is directed downwardly lies below the opening which supplies the blast of air to the jet.

Obviously, various changes and modifications can be made in the construction as hereinbefore described without departing from the spirit or scope of the invention, as defined in the accompanying claims.

What I claim is:—

1. In a furnace provided with a fuel burner, the combination therewith of means to supply a blast of air to the jet issuing from the burner, said means provided with an opening located directly above the jet and extending throughout a part of its length, said opening substantially conforming in shape to the horizontal cross section of the jet.

2. In a furnace provided with a fuel burner, the combination therewith of means to supply a blast of air to the jet issuing from the burner, said means provided with an opening disposed in a horizontal plane located directly above the jet and extending throughout a part of its length, said opening being sufficiently wide to direct the air downwardly over the entire width of the jet at all points throughout the length of the opening.

3. In a furnace provided with a fuel burner, the combination therewith of means to supply a blast of air to the jet issuing from the burner, said means provided with an opening located directly above the jet and extending throughout a part of its length, said opening being substantially triangular in shape, for the purpose described.

4. In a furnace, the combination of a fuel burner, a horizontal shelf-like partition disposed inside of the furnace and substantially in line with the nozzle of said burner, a casing forming with said partition and with the wall of the furnace an air compartment, said partition having an opening above the jet issuing from the burner to direct a blast of air downwardly onto said jet.

5. In a furnace, the combination of a fuel burner, a horizontal shelf-like partition disposed inside of the furnace and substantially in line with the nozzle of said burner, a casing forming with said partition and with the wall of the furnace an air compartment, said partition having an opening above the jet issuing from the burner to direct a blast of air downwardly onto said jet, and an air chamber located exteriorly of the furnace and communicating with the said air compartment.

6. In a furnace, the combination of a fuel burner, a horizontal shelf-like partition disposed inside of the furnace and substantially in line with the nozzle of said burner, a casing forming with said partition and with the wall of the furnace an air compartment, said partition having an opening above the jet issuing from the burner to direct a blast of air downwardly onto said jet, and said casing being spaced from the inner edge of said partition to direct a portion of the air downwardly between the said jets.

In testimony whereof I affix my signature, in presence of two witnesses.

GEORGES EUGÈNE CANHAC.

Witnesses:
HANSON C. COXE,
EMILE KLOK.